(12) United States Patent
O'Neil et al.

(10) Patent No.: US 10,445,358 B2
(45) Date of Patent: *Oct. 15, 2019

(54) METHOD OF INDEXING MULTIMEDIA CONTENT BY CREATING DATABASE RECORDS THAT INCLUDE LOCATION DATA

(71) Applicant: AT&T Intellectual Property II, L.P., Atlanta, GA (US)

(72) Inventors: Joseph Thomas O'Neil, Staten Island, NY (US); Kenneth H. Rosen, Middletown, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,940

(22) Filed: May 4, 2018

(65) Prior Publication Data
US 2018/0253429 A1 Sep. 6, 2018

Related U.S. Application Data

(63) Continuation of application No. 15/236,900, filed on Aug. 15, 2016, now Pat. No. 9,965,476, which is a
(Continued)

(51) Int. Cl.
*G06F 16/435* (2019.01)
*G06F 16/29* (2019.01)
(Continued)

(52) U.S. Cl.
CPC ............ *G06F 16/435* (2019.01); *G06F 16/29* (2019.01); *G06F 16/41* (2019.01);
(Continued)

(58) Field of Classification Search
None
See application file for complete search history.

(56) References Cited

U.S. PATENT DOCUMENTS 4,652,733 A 3/1987 Eng et al.
5,124,915 A 6/1992 Krenzel
(Continued)

OTHER PUBLICATIONS

Multimodal speaker identification with audio-video processingProceedings 2003 International Conference on Image Processing (Cat. No. 03CH37429) Image processing Image Processing, 2003. ICIP 2003 (Year: 2003).*

(Continued)

*Primary Examiner* — William C Vaughn, Jr.
*Assistant Examiner* — Daniel T Tekle

(57) ABSTRACT

A method of indexing multimedia content by creating database records that include location data is disclosed. Devices that generate multimedia content also generate location data corresponding to the location of the device when the content is generated. The location data includes geographical coordinates such as latitude and longitude as well as orientation and tilt. Other data may be recorded such as date and time of day, and light exposure. The content and location data are communicated to a Content Index Processor (CIP) that creates a database record from the location data and determines classifications for the database record that can be used by a person that is searching for particular multimedia content.

20 Claims, 14 Drawing Sheets

Related U.S. Application Data continuation of application No. 11/862,616, filed on Sep. 27, 2007, now Pat. No. 9,420,147, which is a continuation of application No. 10/121,343, filed on Apr. 12, 2002, now Pat. No. 8,630,526.

(51) Int. Cl.
  *G06F 16/41* (2019.01)
  *G06F 16/9535* (2019.01)
  *G06F 16/9537* (2019.01)
  *H04N 5/225* (2006.01)
  *H04N 5/232* (2006.01)

(52) U.S. Cl.
  CPC ...... *G06F 16/9535* (2019.01); *G06F 16/9537* (2019.01); *H04N 5/2251* (2013.01); *H04N 5/2258* (2013.01); *H04N 5/2327* (2013.01); *H04N 5/23261* (2013.01)

(56) References Cited

U.S. PATENT DOCUMENTS

| | | | |
|---|---|---|---|
| 5,296,886 A | 3/1994 | Honda et al. | |
| 5,633,946 A | 5/1997 | Lachinski et al. | |
| 5,642,285 A | 6/1997 | Woo et al. | |
| 5,926,116 A | 7/1999 | Kitano | |
| 6,091,816 A | 7/2000 | Woo | |
| 6,122,628 A | 9/2000 | Castelli et al. | |
| 6,134,541 A | 10/2000 | Castelli et al. | |
| 6,154,689 A | 11/2000 | Pereira et al. | |
| 6,222,985 B1 | 4/2001 | Miyake | |
| 6,282,362 B1 | 8/2001 | Murphy et al. | |
| 6,351,613 B2 | 2/2002 | Ohkado | |
| 6,663,491 B2 * | 12/2003 | Watabe | A63F 13/10 463/36 |
| 2002/0035620 A1 | 3/2002 | Takahashi et al. | |
| 2002/0156412 A1 * | 10/2002 | Rugenstein | A61M 1/3679 604/5.03 |
| 2002/0167442 A1 * | 11/2002 | Taylor | G01C 21/36 342/357.64 |
| 2002/0186412 A1 * | 12/2002 | Murashita | H04N 1/00127 358/1.16 |
| 2002/188841 A1 | 12/2002 | Jones et al. | |
| 2003/0004916 A1 * | 1/2003 | Lewis | H04N 1/00132 |
| 2003/0023377 A1 | 1/2003 | Chen et al. | |
| 2003/0052875 A1 | 3/2003 | Salomie | |
| 2003/0123713 A1 | 7/2003 | Geng | |
| 2005/0160271 A9 | 7/2005 | Brundage et al. | |

OTHER PUBLICATIONS

Haskell et al., "Digital Video: An Introduction to MPEG-2", Digital Multimedia Standards Series, 4 pages.
Want et al., "Expanding the Horizons of Location-Aware Computing", Guest Editors' Introduction, IEEE, Aug. 2001, pp. 31-34.
Davies et al., "Using and Determining Location in a Context-Sensitive Tour Guide", Cover Feature, IEEE, Aug. 2001, pp. 35-48.
Hightower et al., "Location Systems for Ubiquitous Computing", Cover Feature, IEEE, Aug. 2001, pp. 57-66.

* cited by examiner

Fig. 3

| TYPE OF CONTENT | TIME | DATE | LOCATION DATA ||| LIGHT EXPOSURE | USER DESCRIPTION |
| --- | --- | --- | --- | --- | --- | --- | --- |
| | | | LONG. | LAT. | ORIENT. ANGLE | | |
| IMAGE | 11:30 AM | 5/17/02 | 73° 58 MINUTES WEST | 40° 42 MINUTES NORTH | 95\ 14 | HIGH | STATUE OF LIBERTY; SUNNY; FROM JERSEY CITY |

Fig. 4

| LONG. | LAT. | COUNTRY | REGION | STATE | CITY |
|---|---|---|---|---|---|
| 73° 58 MINUTES WEST | 40° 47 MINUTES NORTH | USA | NORTHEAST | NJ | HOBOKEN |
| 73° 58 MINUTES WEST | 40° 42 MINUTES NORTH | | | | JERSEY CITY |
| 74° 10 MINUTES WEST | 40° 42 MINUTES NORTH | | | | NEWARK |
| 73° 40 MINUTES WEST | 40° 20 MINUTES NORTH | | | | ASBURY PARK |
| ⋮ | ⋮ | | | | ⋮ |

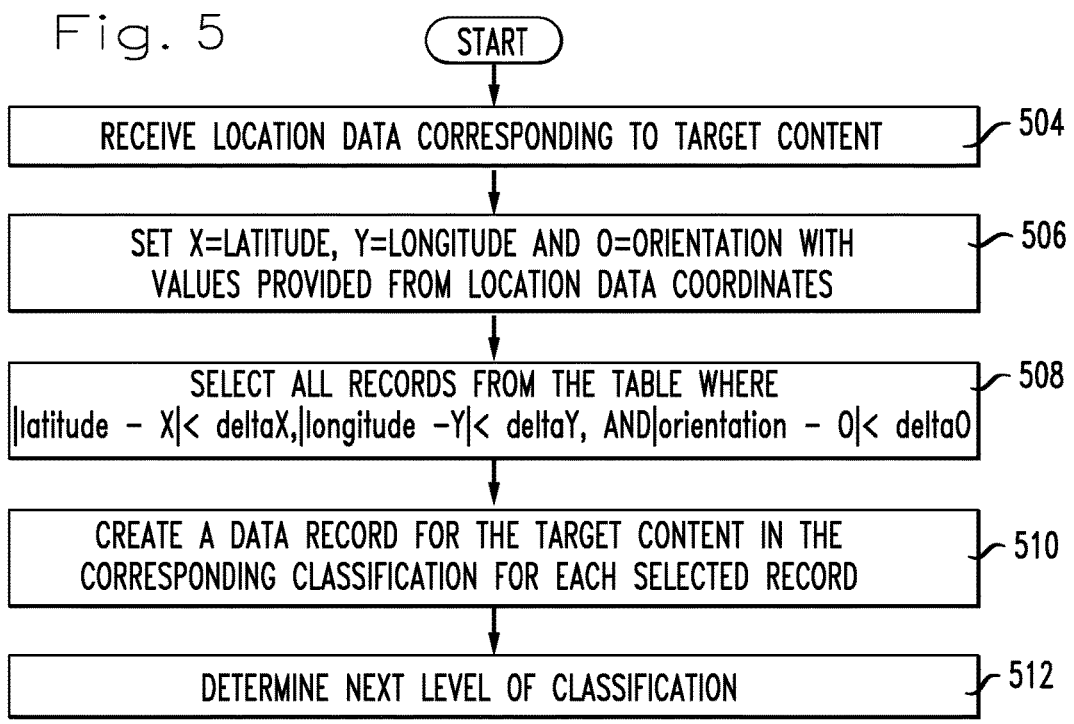

Fig. 5

START
↓
RECEIVE LOCATION DATA CORRESPONDING TO TARGET CONTENT — 504
↓
SET X=LATITUDE, Y=LONGITUDE AND O=ORIENTATION WITH VALUES PROVIDED FROM LOCATION DATA COORDINATES — 506
↓
SELECT ALL RECORDS FROM THE TABLE WHERE |latitude − X|< deltaX, |longitude −Y|< deltaY, AND |orientation − O|< deltaO — 508
↓
CREATE A DATA RECORD FOR THE TARGET CONTENT IN THE CORRESPONDING CLASSIFICATION FOR EACH SELECTED RECORD — 510
↓
DETERMINE NEXT LEVEL OF CLASSIFICATION — 512

| CITY | ORIENTATION | ANGLE | POTENTIAL LANDMARK |
|---|---|---|---|
| JERSEY CITY | 92 | 11 | GEORGE WASHINGTON BRIDGE |
| | 93 | 12 | EMPIRE STATE BUILDING |
| | 94 | 13 | CHRYSLER BUILDING |
| | 95 | 14 | STATUE OF LIBERTY |
| ⋮ | ⋮ | ⋮ | ⋮ |

Fig. 10

REFINE CONTENT RETRIEVAL
Describe the type of content you want to retrieve
(e.g. photographs, early evening, clear weather, looking northeast)

video, June – September, seal lions, sunny weather

1002

SUBMIT
1004

CANCEL
1006

METHOD OF INDEXING MULTIMEDIA CONTENT BY CREATING DATABASE RECORDS THAT INCLUDE LOCATION DATA

PRIORITY INFORMATION

The present application is a continuation of U.S. patent application Ser. No. 15/236,900, filed Aug. 15, 2016, which is a continuation of U.S. patent application Ser. No. 11/862,616, filed Sep. 27, 2007, now U.S. Pat. No. 9,420,147, issued Aug. 16, 2016, which is a continuation of U.S. patent application Ser. No. 10/121,343, filed Apr. 12, 2002, now U.S. Pat. No. 8,630,526, issued Jan. 14, 2014, the contents of which is incorporated herein by reference in its entirety. This application is related to U.S. patent application Ser. No. 11/845,351, filed Aug. 27, 2007, now abandoned, the contents of which is incorporated herein by reference in its entirety.

FIELD OF THE INVENTION

The present application is directed to a method of indexing multimedia content, and, more particularly to a system and method for creating a database record that includes location data and can be used to search and retrieve multimedia content.

BACKGROUND OF THE INVENTION

With the advancements in digital and mobile communications technologies, many people are now able to communicate anytime and anywhere. Devices such as digital cameras, personal communication devices, digital camcorders and other similar types of devices are now reasonably accessible to most people. Many of these types of devices allow the user to capture multimedia content and store that content either locally on the device or to upload the content to a computer or other storage device. The user can then access the content on demand.

Furthermore, a user with a computer typically also has access to software that can be used to alter the multimedia content. For example, images can be altered in size, brightness and color. By altering the multimedia content, the user can enhance his enjoyment of the content. In addition, most users that have computers also have access to the Internet. Internet access enables a user to share the multimedia content with other users. The multimedia content can be shared using email or by posting the content on a web site.

One disadvantage to the increased popularity of the Internet is that the types of information that are available to a user increase dramatically. As such, it becomes increasingly difficult for a user to locate desired information or multimedia content. For example, if a user is sightseeing in New York City and uses his digital camera to take pictures of the Statue of Liberty, the user may be interested in online content that relates to the Statue of Liberty (e.g., other images, audio or text data, etc.). While search engines currently exist which are able to identify web sites based on key word searches, these engines do not always identify the desired content. Furthermore, techniques exist which allow for a device, such as a digital camera, to store geographic data pertaining to the image being obtained. Such data could be used to identify other similar data (e.g., other images of the same object, landmark, etc.). This type of data is not used by existing search engines to identify related content. It would be useful to be able to index and store multimedia content in a network such that the content could be retrieved by other users interested in the same content.

SUMMARY OF THE INVENTION

The present invention is directed to a method of indexing multimedia content. Multimedia content to be indexed and associated identification data is received from a device which generated the multimedia content. Location coordinates for the device are extracted from the identification data. A searchable database record associated with the multimedia content is created. At least one classification for the database record is determined based on the location coordinates. The database record is stored in each database associated with a determined at least one classification. The location data includes geographical coordinates such as latitude and longitude as well as orientation and tilt. Other data may be recorded such as date and time of day, and light exposure. The content and location data are communicated to a Content Index Processor (CIP) that creates a database record from the location data and determines classifications for the database record that can be used by a person that is searching for particular multimedia content.

BRIEF DESCRIPTION OF THE DRAWINGS

The present invention is illustrated by way of example and not limitation in the accompanying figures in which like reference numerals indicate similar elements and in which:

FIG. 3 is an exemplary database record for multimedia content in accordance with the present invention;

FIG. 4 is a table illustrating a first level of classification in accordance with the present invention;

FIG. 5 is a flowchart illustrating a technique for matching approximate coordinates with an intended target;

FIG. 10 illustrates an exemplary web page for further refining the number and types of content associated with a selected bookmark;

DETAILED DESCRIPTION

Figure 1:
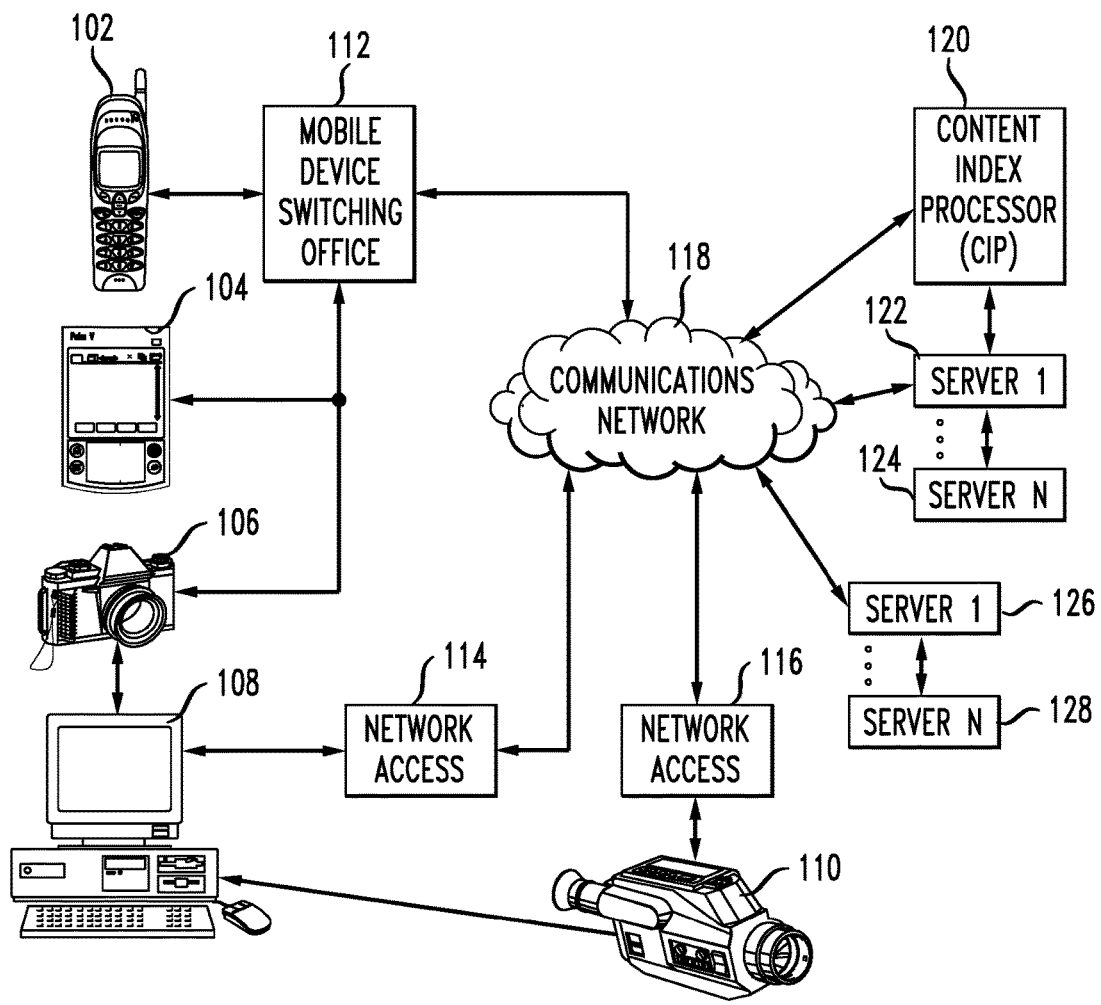
FIG. 1 is a block diagram of a network architecture in which the method of the present invention may be implemented.

FIG. 1 is a block diagram of a network architecture of a representative communications network in which the method of the present invention may be implemented. Multiple types of devices may be used to collect multimedia content. Examples of such devices include a cellular telephone 102, Personal Digital Assistant (PDA) 104, digital camera 106 or digital camcorder 110. These mobile devices can be used to record digital content at a desired location. Each of these devices is connected by network access to a communications network 118. The network access may be achieved by a variety of techniques.

For example, a mobile device switching office 112 may be used to connect a wireless device such as the cellular telephone 102 or PDA 104 to the communications network 118. Other types of network access 112, 114 could include cable modem, satellite modem, or dial up over the Public Switched Telephone Network (PSTN). In addition to direct network access, the mobile devices could upload multimedia content to a computer 108 which is then able to connect to the communications network 118 via network access 114.

The communications network 118 may be a single network or a combination of networks. For example, the communications network 118 may be a cable network or a data network, such as an Asynchronous Transfer Mode (ATM) network or frame relay network or other type of broadband network such as, but not limited to a Digital Subscriber Line (DSL), ISDN or a combination of these networks. The communication network 118 may also be a packet network which may comprise a single packet network or a multiplicity of packet networks, such as, e.g., the "backbone" networks comprising the Internet or an Intranet. Data sent over a data or packet network can be encrypted, for example, using a 128-bit RSA algorithm.

New multimedia content is directed to a Content Index Processor (CIP) 120. The CIP extracts data from the multimedia content needed to create a database record for the content as will be described in more detail hereinafter. Once the database record is created, the record and associated content is stored in one or more servers. It is to be understood by those skilled in the art that the amount of content generated and/or accumulated for searching will affect the number of servers required and the manner in which the servers are arranged.

For example, in a fairly extensive system, a plurality of distributed servers may be used. Server group 122 and 124 and server group 126 and 128 are examples of such arrangements. The content stored in each server can be determined based on the geographic location (e.g., landmark) or region from which content originates, type of content (e.g., video, audio or combination), and the source of the content (e.g., commercial grade content, amateur content, content provided by a sponsor such as an airline or travel agent, etc.). The servers can also be networked together such that some content is stored on local servers which are then networked to regional servers and finally to international servers.

Figure 2:
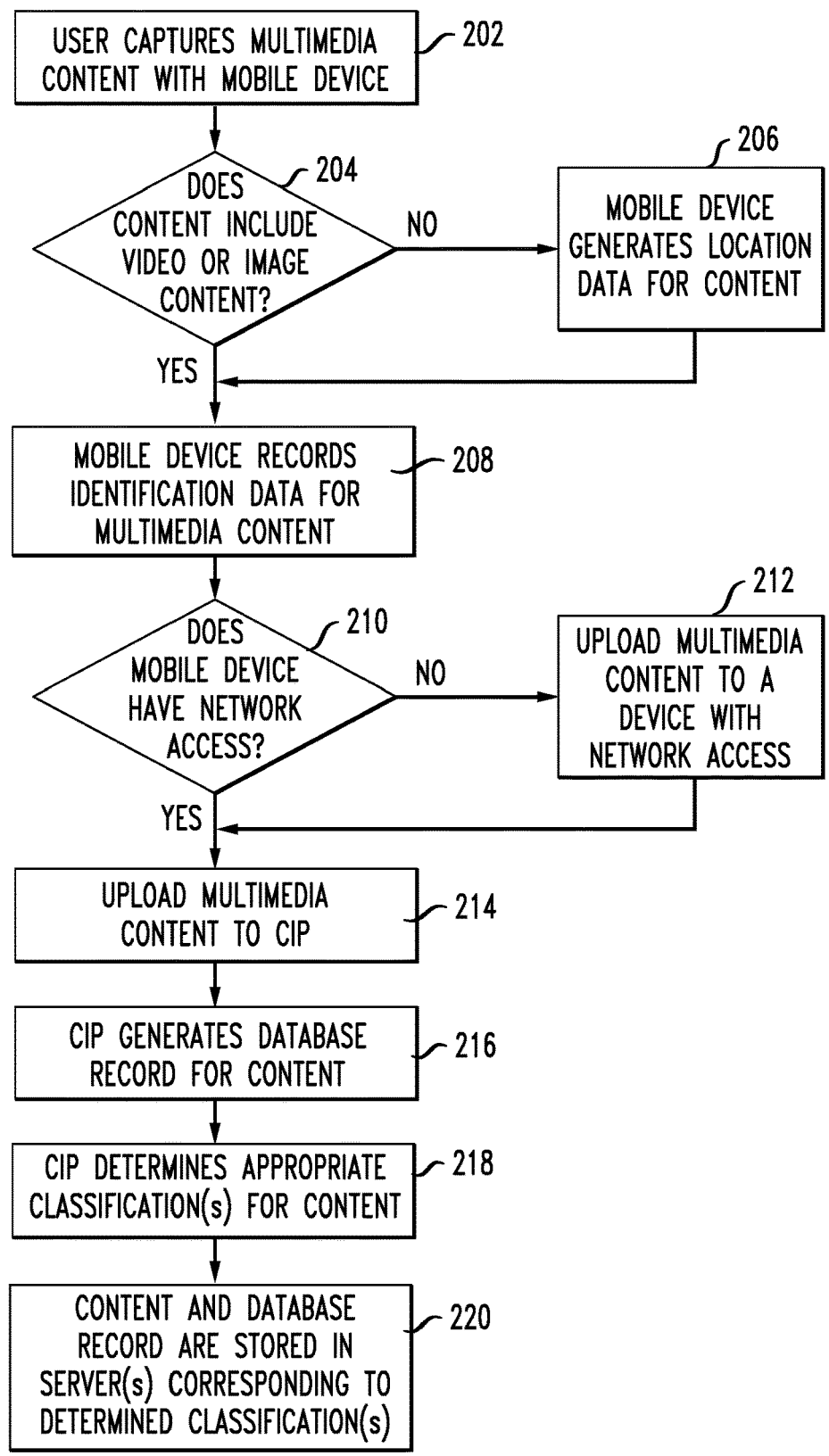
FIG. 2 is a flow chart illustrating the steps for indexing and storing multimedia content in accordance with the present invention.

With reference to FIGS. 1 and 2 a method for indexing and storing multimedia content will now be described. A user of a mobile device (e.g., digital camera 106) captures multimedia content (step 202). In the present example, the multimedia content is an image (step 204). Because the content is a digital image, the digital camera 106 then generates location data for the content (step 206). The digital camera may include, for example, a Global Positioning System (GPS) which uses well known techniques for identifying the location of an object (e.g., the latitude and longitude measurements for a location from which content is recorded).

The digital camera may also include software for further defining the location of the content. The additional location data may include the angle at which the content is recorded and the direction from which the content is recorded. This information in combination with the GPS data can more accurately identify the content (e.g., the particular landmark being imaged).

Devices currently exist that can be used to generate multimedia content and the desired location data. One such device is a Global Positioning System Kit which is manufactured by Eastman Kodak Company and can be used with Kodak's DC290 digital camera. More information about the Kodak DC 290 digital camera can be found at http://www.kodak.com/global/en/service/products/ekn006599.jhtml. Additional information about the GPS kit can be found at http://www.kodak.com/cluster/global/en/professional/products/canmeras/desTech/gps.jhtml. Another device which is currently prototyped and available in Japan is the PEGA-MSC1 digital camera and PEGA-MSG1 GPS system that are both manufactured by Sony Corporation.

There is also software available from a company called GeoSpatial Experts that links digital photos with the latitude and longitude of the position where the image was generated. More information about this software can be found at http://www.geospatial.experts.com/gpsphotolink.html.

The identification data is placed in a header that is associated with the recorded image. Once the image is recorded and the header is generated, it is determined whether the digital camera 106 has access to the communications network 118 (step 210). In the present example, the digital camera 106 does have network access. As such the multimedia content and the header are uploaded to the Content Index Processor 120 (CIP) (step 214). As will be described in further detail hereinafter, the CIP 120 collects the identification data from the digital camera to create a database record.

Next, the CIP 120 determines one or more appropriate classifications for the content based on the created database record (step 216). The classifications are important in ensuring that similar content is grouped together. In accordance with the present invention, the CIP 120 determines the possible definitions of similar content and classifies the content accordingly. Since content may become a member of multiple classifications, multiple database records may be created for the content.

Classifications for the content may be based on the subject matter of the content, the date and/or time that the content was recorded, or other content that is geographically proximate to the subject matter of the content.

In order to reduce redundancy, a single copy of the content is stored in one of the servers and pointers are created to it from the created database records. When the CIP has completed identifying the classifications and generating the resultant database records, the database records and content are stored in one or more servers (step 220).

In furtherance of the present example, it is assumed that the user of the digital camera 106 is recording an image of the Statue of Liberty from Jersey City. Referring to FIG. 3, there is shown an exemplary database record that is generated in accordance with the present invention. It is to be understood by those skilled in the art that the content and the arrangement of information in the data record can be modified without departing from the scope and spirit of the present invention. The database record is generated automatically by the CIP and can be modified by inputs from the user.

Included in the database record is an indication of the type of multimedia content 302 being recorded. The type of content would be, for example, video, audio or image content. In the present example, the content is an image recorded by the digital camera 106. Next is an indication of the time 304 and the date 306 when the image was recorded. The time entry 304 can include time zone (not shown) and be in a standard or military format. The date entry 306 can also assume multiple formats. In the present example, the time is 11:30 AM and the date is May 17, 2002.

The next entry pertains to the location data 308. Included in the location data are longitude 310, latitude 312, orientation 314 and angle 316 readings that approximately correspond to the location of the image that is being recorded. In the present example, the longitude=−77.02, latitude=38.89, orientation=90, and angle=10 which corresponds to a location in the Washington, D.C. area. Another entry may be included to indicate light conditions 318. This entry is based on readings made by the mobile device. In the present example, the light exposure is based on a range from 0 to 100 where 0=absolute black and 1=absolute white.

A final entry is a description 320 of the content. The user provides the description entry. Depending upon the capabilities of the mobile device, the description may be inputted using the mobile device or the content can be uploaded to computer 108 and inputted at a later time. In the present example, the user enters the name of the landmark being imaged (e.g., Statue of Liberty), the weather (e.g., sunny) and the point of origin from where the image was recorded (e.g., Jersey City).

Once the database record is generated, the CIP 120 determines the classification(s) for the record. It is to be understood by those skilled in the art that many database products in the current art allow database records to be indexed by the values in any field or combination of fields. Examples of such products include Oracle, Sybase, and SQL Server. The geographical data recorded for the image is used to locate the general area in which the image is recorded and to identify what landmark or object is being imaged. Once this data is initially processed, the data record is compared with a list of priorities or definitions which are stored in the CIP 120. In some instances, the priority may be based on the type of content or the location of content. In this example, since a description is provided which identifies the landmark, the identity of the landmark may be the first priority data, followed by the location data, and in particular the orientation data.

FIG. 4 illustrates an exemplary table from which a first level geographical classification may be determined. The table illustrates a partial listing of geographical locations. The listings are initially based on longitude and latitude coordinates and then correlated to geographical regions. The regions may be broken down into a hierarchy starting including country, region, state, city and if possible landmark. It is to be understood by those skilled in the art that the longitude and latitude coordinates for the content do not need to exactly match a pair of coordinates in the table of FIG. 4. Since GPS readings do not provide the level of accuracy to determine with certainty the true "target" of the image, an approximation technique must be used to identify the intended target.

FIG. 5 is a flowchart illustrating an algorithm that can be used to search for the target content that has approximately the same position and orientation as the location data coordinates. The CIP receives location data corresponding to the coordinates recorded for the target image (step 504). Parameters are then set to correspond to each coordinate element. In the present example, X is equal to the latitude coordinate, Y is equal to the longitude coordinate and O is equal to the orientation coordinate (step 506). These parameters are compared with like coordinate elements for each record in the table.

Records in which |latitude−X|<deltaX, |longitude−Y|<deltaY, 0 and |orientation−O|<deltaO where X, Y, and O are the latitude, longitude, and orientation of the target image, latitude, longitude and orientation are the coordinate values for the record being compared and deltaX, deltaY, and deltaO are predetermined constants that define an "area" around the location data coordinates. Those records for which the above relationships apply are selected (step 508). The classification for each selected record is determined. A new database record corresponding to the target image is created and associated with the determined classification for each selected record (step 510). Then the next level of classification is determined (step 512). It is to be understood by those skilled in the art that any type of approximation technique can be used to match the longitude and latitude coordinate pair with a coordinate pair in the table without departing from the scope and spirit of the present invention.

In the present example, the longitude and latitude coordinates for the image would be latitude=38.89 and longitude=−77.02. Using the above approximation techniques, the longitude and latitude coordinates would be matched to a plurality of potential coordinates. Those coordinates may include, for example, Northeastern U.S.A., Washington D.C., New York City and Jersey City, N.J. This would provide a first level of classification for the origination of where the content was recorded. Once the origination point has been established, a second table such as the one illustrated in FIG. 6 is used to try to identify the landmark for which the image is recorded.

Figures 6, 7:
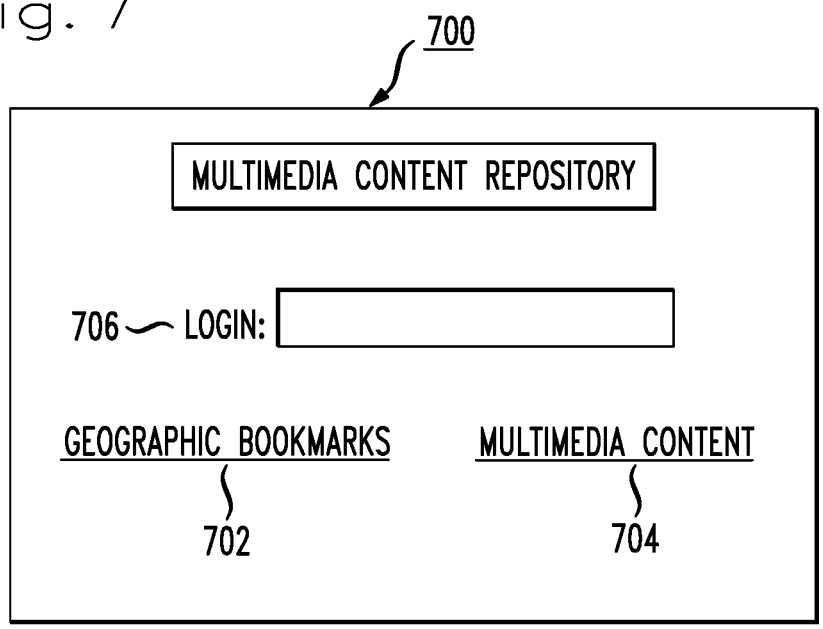
FIG. 6 is a table illustrating a second level of classification in accordance with the present invention.
FIG. 7 illustrates an exemplary web site for retrieving and bookmarking multimedia content in accordance with the present invention.

The table illustrated in FIG. 6 shows a further refinement of the landmarks that can be viewed from the longitude and latitude coordinates (in this case the coordinates corresponding to Jersey City) based on the orientation and angle. The table lists a plurality of pairs of orientation and angle coordinates and the potential landmark that can be viewed as a result of using those coordinates. In the present example, the orientation and angle coordinates are 90 and 10 respectively. Again as with the table in FIG. 4 it is likely that the match of the orientation and angle coordinates associated with the image will not exactly match the coordinates in the table and approximation techniques may be required to find a match. Furthermore, it is to be appreciated that multiple locations may be possible matches for the coordinates because of the current precision of GPS readings. In the present example, the orientation and angle coordinates match those coordinates corresponding to the Statue of Liberty. This provides a second level of classification for the database record. Depending upon the amount of content available and associated with a particular landmark and the desired amount of classification, the database record can be further classified based on time of day, time of year or weather conditions. By associating the database record with multiple classifications, a user who wishes to search for indexed content may do so in a way in which the desired content is likely to be found as will be described in further detail hereinafter.

In accordance with the present invention, a web site may be created which could be used by Internet-enabled devices to identify location-dependent multimedia content and to create and store geographic bookmarks so that the user may easily revisit particular multimedia content. FIG. 7 illustrates an exemplary web site 700 for searching for multimedia content and creating and storing geographic bookmarks in accordance with the present invention. The web site includes two links, one for retrieving geographic bookmarks 702 and a second link for retrieving multimedia content 704. A login box 706 is also included so that users can specifically register and link multimedia content and bookmarks for their personal use. The login box 706 could also be used by commercial providers of content to register their content and keep track of retrieval of their content by other users. It is to be understood by those skilled in the art that the number and types of links as well as the arrangement of the links on the web site is not material to the present invention.

Figure 8:
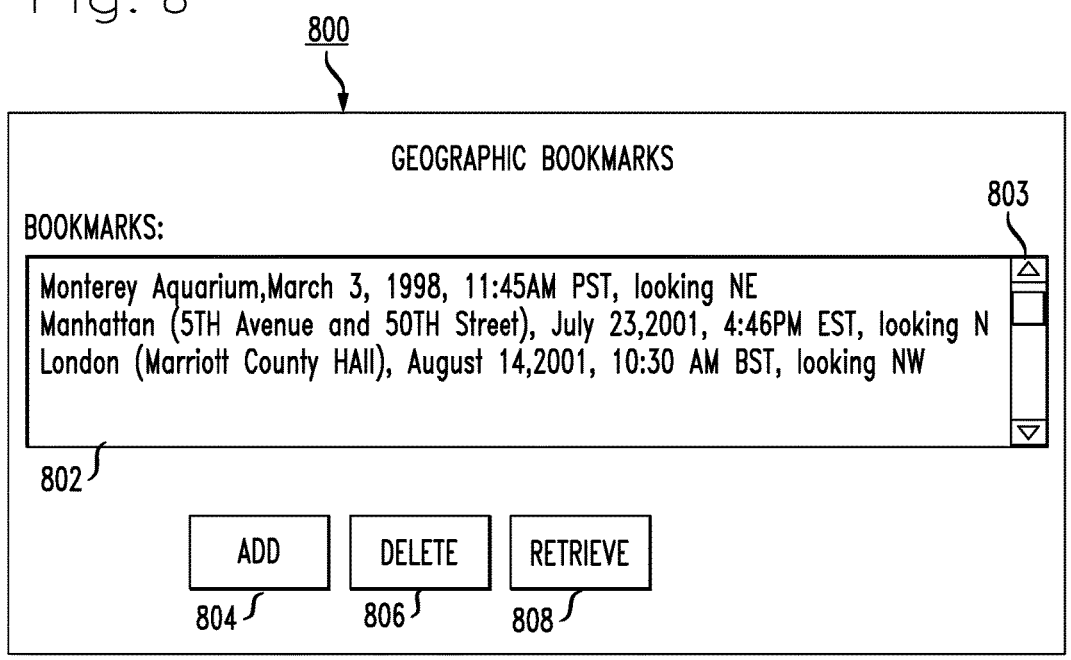
FIG. 8 illustrates an exemplary web page for viewing and administering geographic bookmarks in accordance with the present invention.

In the present example, it is assumed that a non-commercial user is accessing the web site. If the user wishes to view any geographic bookmarks that the user has stored, the user selects the geographic bookmarks link 702 and another web page is presented to the user that lists all of the bookmarks created by that user. An exemplary web page 800 is illustrated in FIG. 8.

Each bookmark created by the user is presented in a list 802. As illustrated in FIG. 8, the list 802 may include a scroll 803 so that all of the user's geographic bookmarks can be viewed. This is particularly useful when the user has stored a large number of bookmarks. Also included on the web page 800 are some administrative buttons 804, 806, 808 that allow the user to maintain his or her bookmarks. An add button 804 is provided to allow the user to add geographic bookmarks to his or her list. A delete button 806 allows the user to delete any unwanted geographic links. A retrieve button 808 allows the user to access the multimedia content associated with any particular geographic bookmark.

Figure 9:
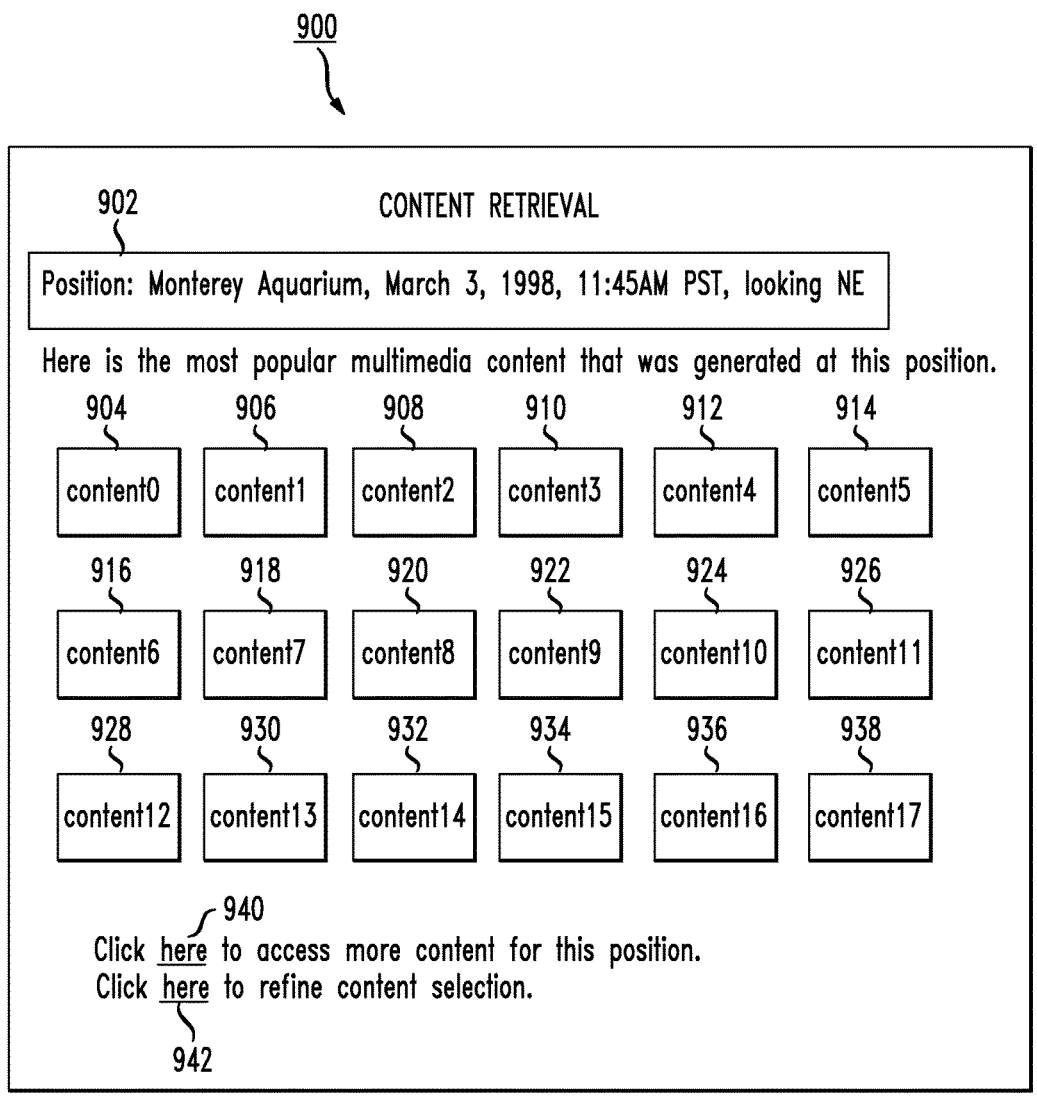
FIG. 9 illustrates an exemplary web page for retrieving multimedia content associated with a particular geographic bookmark.

For example, the bookmark for content pertaining to the Monterey Aquarium may be selected. An exemplary web page 900 illustrating how related content may be presented to the user in response to the selected bookmark is illustrated in FIG. 9. The web page 900 contains identification 902 of the selected bookmark and a plurality of links to multimedia content 904-938 that are determined to be related to the selected bookmark. As described previously, data records which have been classified in a category related to the selected bookmark would be presented as a link that can then be selected by the user.

Each link 904-938 would preferably provide some brief description of the multimedia content to which it is linked. If a user selects a link, the content associated with that particular link is retrieved from a server (FIG. 1) on which it is stored and presented to the user. In another embodiment of the present invention, the link may provide an indication of the type of content associated with the link and an indication as to whether the content is associated with a commercial entity. In such an instance, there may be a charge associated with retrieving the content. In addition, the content may be perceived to be of better quality than content generated by a non-commercial entity.

The web page also includes a link 940 that allows the user to access additional content that may be associated with the bookmark. Such a link would be used if all of the related links did not fit on a single web page. Another link 942 allows the user to use filtering techniques to refine the number of links associated with the selected bookmark. If link 942 is selected a web page such as that illustrated in FIG. 10 may be presented to the user.

When a user wishes to refine the type of content that is associated with a particular geographic bookmark, the user may use search terms to filter out that content which is desirable to the user. An input box 1002 is provided which allows the user to provide search criteria to be used by the CIP to narrow down the content. The manner in which the search terms are provided is arbitrary. For example, a list of criteria separated by commas could be used (as shown), Boolean search terms or searching by database entries (e.g., content type=video). In the present example, the user is searching for video content taken in the months of June-September of seal lions in sunny weather. By clicking on the submit button 1004 the search criteria is transmitted to the CIP. If for some reason the user changes his or her mind, the user can click on the cancel button 1006. Using the content associated with the geographic bookmark as the material to be searched, the CIP then identifies all content which meets the search criteria.

Figure 11:
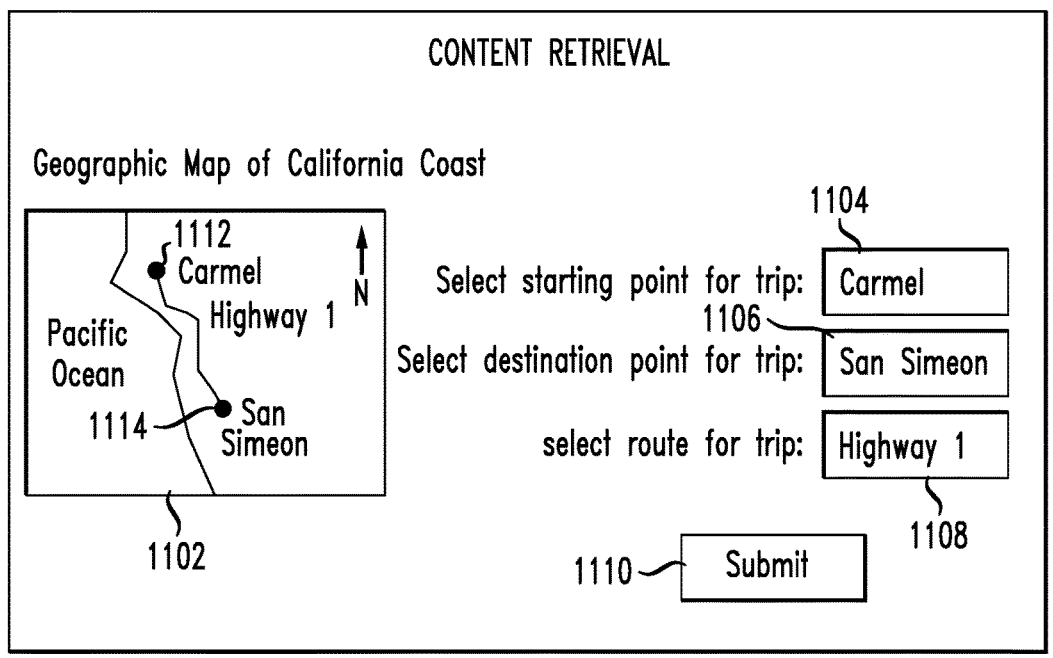
FIG. 11 illustrates an exemplary web page for identifying search criteria to be used for retrieving multimedia content in accordance with the present invention.
Figure 12:
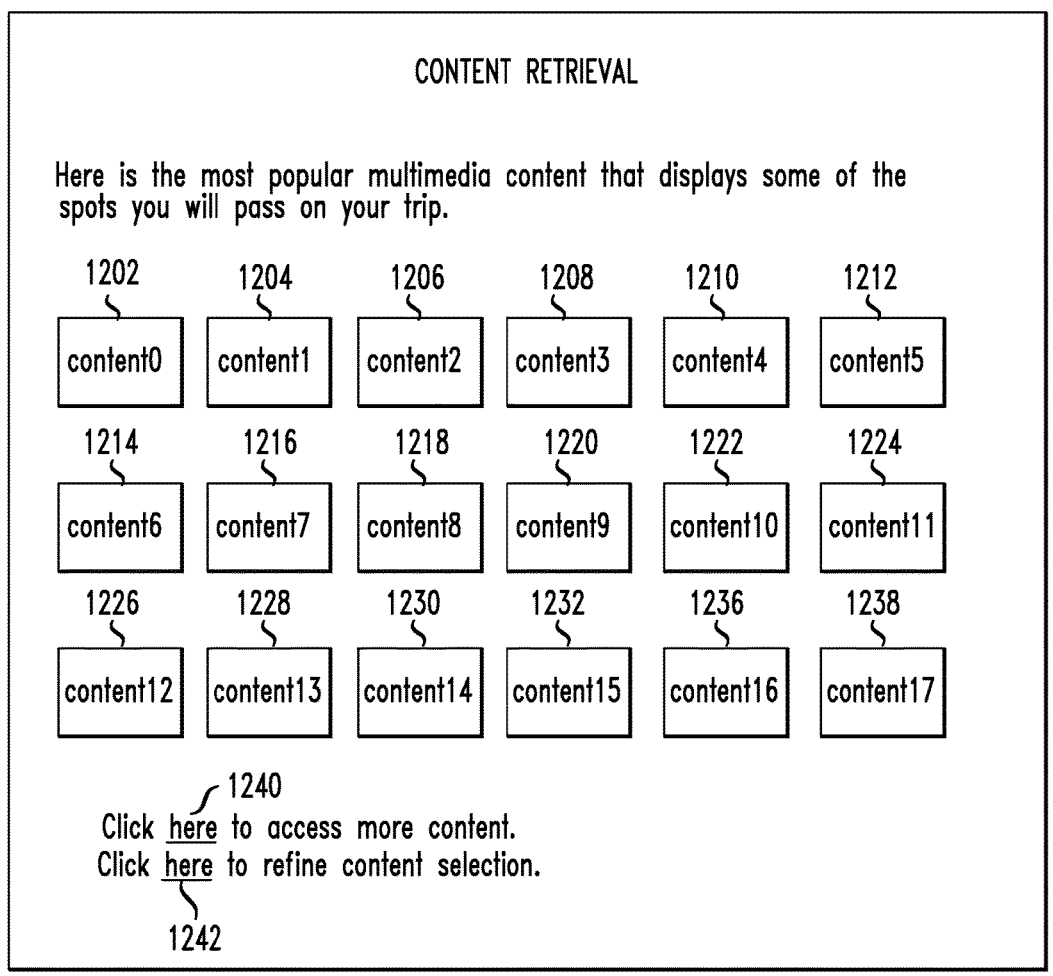
FIG. 12 illustrates an exemplary web page for displaying search results in response to a search query for particular multimedia content.

Another method for identifying multimedia content is illustrated in FIG. 11. Such a method can be used when planning a trip in order to retrieve multimedia content relating to sights of interest that will be visited. The user enters a starting point at input box 1104 and a destination point at input box 1106. In the present example, the user is planning to take a ride along the California coast starting at Carmel and ending up at San Simeon. The route to be taken is also provided at input box 1108. In the present example, Highway 1 will be traveled. Once the user has entered all known criteria, the submit button 1110 is activated and a map 1102 depicting the travel route is displayed.

The search criteria are transmitted to the CIP which retrieves all relevant content. The results are displayed as links 1202-1238 to the user. The results can be displayed in any manner such as, for example, a fingernail sketch description of the content and/or a preview of the content. By activating a particular link, the content associated with that link is retrieved and presented to the user. If there are more items than can reasonably be displayed on the web page, a link 1240 may be provided to allow the user to retrieve additional web pages that contain the links to the additional content that satisfies the search criteria. Another link 1242 is provided if the user wishes to further refine the type and amount of retrieved content.

Figure 13:
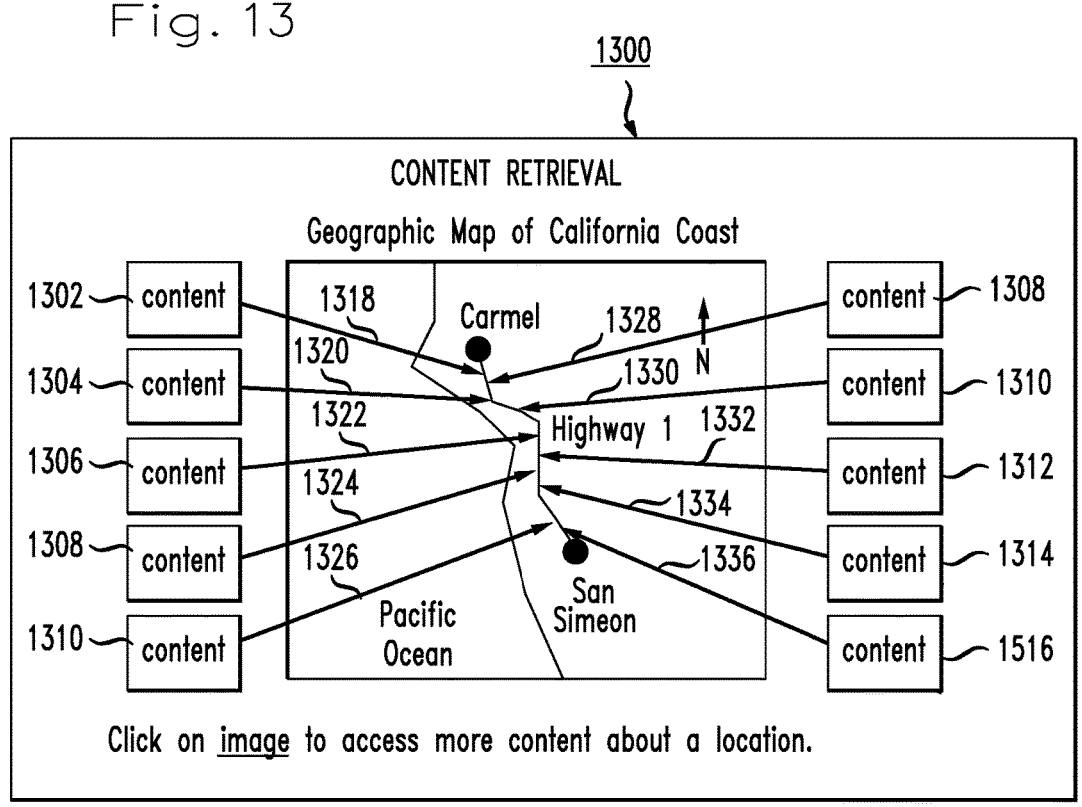
FIG. 13 illustrates an alternative exemplary web page for displaying search results in response to a search query for particular multimedia content.

FIG. 13 illustrates a web page that uses an alternative presentation of the search results retrieved from the CIP. The map 1102 (see FIG. 11) which was generated previously that displays the travel route is presented on the page 1300. Links 1302-1316 corresponding to the retrieved multimedia content are also displayed. Each link 1302-1316 is also associated with an arrow 1318-1336 which points to a location on the map 1102 that corresponds to the location at which the content was generated. By activating a particular link, the content associated with that link is retrieved and presented to the user. By using this technique the user can easily determine the subject matter of the content that is available and decide which content to receive.

Figure 14:
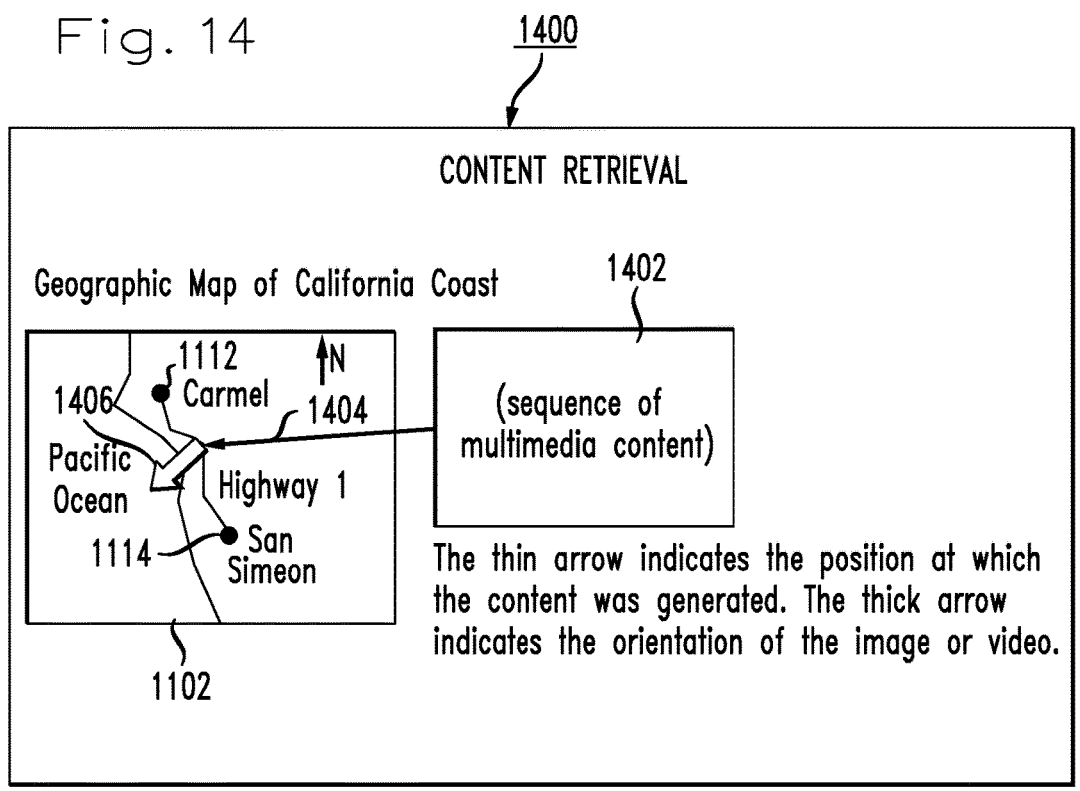
FIG. 14 illustrates an exemplary web page for displaying the retrieval of particular multimedia content in accordance with the present invention.

FIG. 14 illustrates a technique that can be used to retrieve particular multimedia content in accordance with the present invention. When a link (e.g., link 1308) is activated by the user, the multimedia content 1402 is retrieved and presented to the user for viewing and/or listening purposes. In accordance with an embodiment of the present invention, the map 1102 is also provided on the web page 1400. Included on the map 1102 are the start location 1112 and the destination location 1114. Also included is the arrow 1404 that corresponds to the position at which the content was generated. A second arrow 1406 provides an indication as to the orientation of the device that generated the content.

Figure 15:
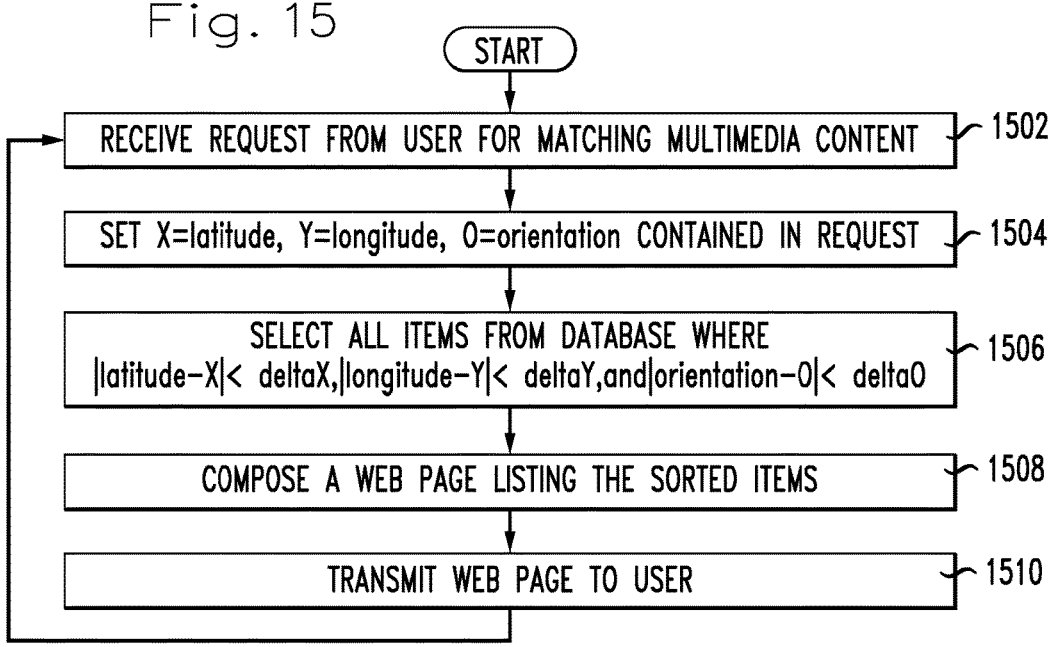
FIG. 15 illustrates a flow chart that depicts the steps for identifying stored content based on the position of the device that generated the content.

FIG. 15 illustrates a method for identifying content to be retrieved based on the position of the device that generated the content in accordance with the present invention. The CIP receives a request from a user for the retrieval of content based on location information that corresponds to the location of the device creating the content (step 1502). The request preferably includes location coordinates such as latitude, longitude and orientation. The CIP extract these coordinates and establishes those values as constants where X=latitude, Y=longitude and O=orientation (step 1504). Next, the CIP performs a search and selects all records in which the following relationships are found: |latitude—X|<delta X; |longitude—Y|<deltaY; and |orientation—O|<deltaO, where deltaX, deltaY and deltaO are predetermined values (step 1506). Once all of the records have been identified, a web page is created which lists the retrieved records and can be of the type discussed previously (step 1508). The web page is then transmitted to the user (step 1510).

Figure 16:
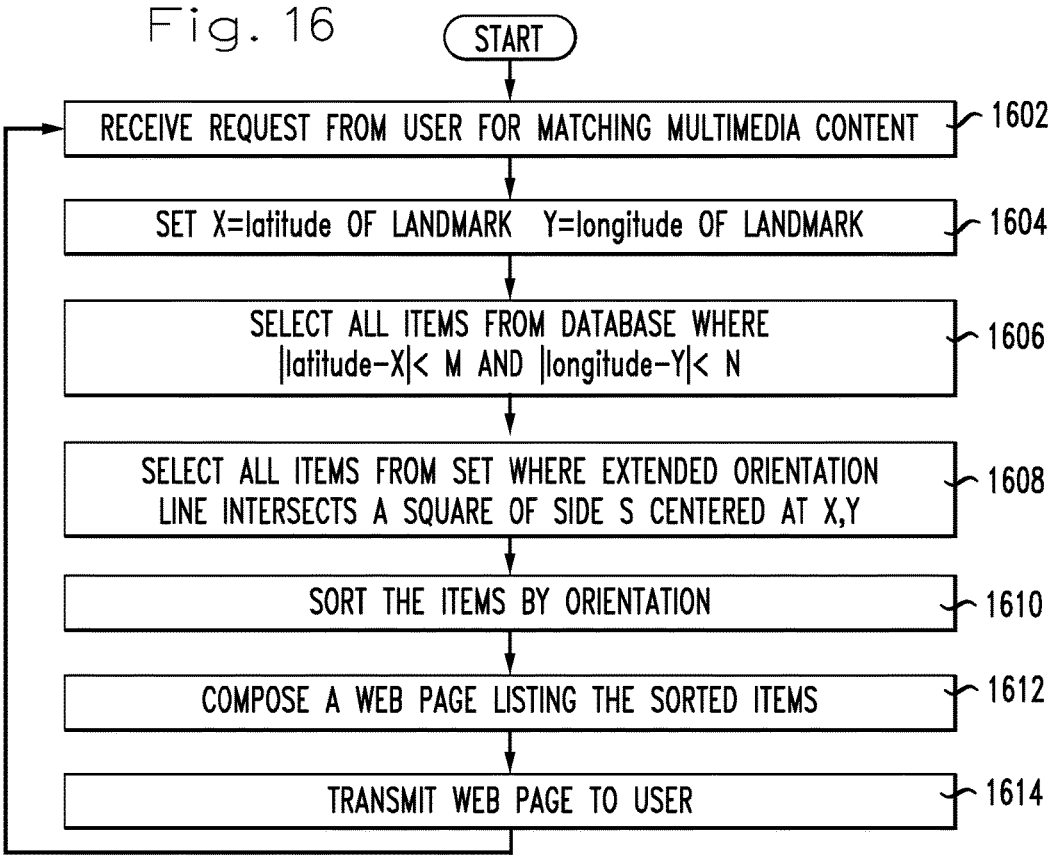
FIG. 16 illustrates a flow chart that depicts the steps for identifying multimedia content generated of a particular landmark that considers the orientation of the device creating the content relative to the landmark position.

FIG. 16 illustrates a method for identifying multimedia content that depicts different views of a landmark based on the geographic coordinates for the landmark. A request is received from the user for matching multimedia content (step 1602). Included in the request is the latitude and longitude coordinates corresponding to a particular landmark. Alternatively, the request can include the name of the landmark and a search can be performed by the CIP in a database that contains a comprehensive list of landmarks and corresponding coordinate values.

The location coordinates are then established as constants where X=latitude coordinate and Y=longitude coordinate (step 1604). A search is performed by the CIP and all records are retrieved for content in which the following relationships are found: |latitude—X|<M and |longitude—Y|<N, where N and M are predetermined values (step 1606). Then a second level of searching is performed in which the selected items are searched to determine if an extended orientation line intersects a square that is centered at the X and Y coordinates (step 1608). All of the records are then sorted by orientation (step 1610). A web page is composed which lists the sorted records (step 1612). The web page is then transmitted to the user (step 1614).

Figure 17:
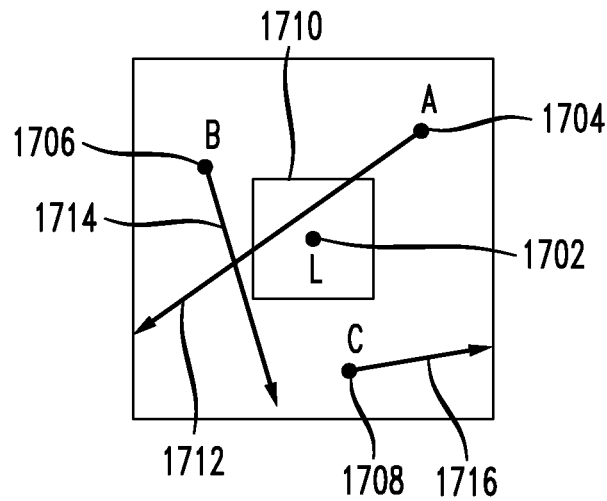
FIG. 17 illustrates a method for determining if a device has recorded content pertaining to a landmark L in accordance with the present invention.

To more clearly understand the method described above, reference is made to FIG. 17. Referring to FIG. 17, there is shown a landmark L 1702 that is the subject of a multimedia request by the user. A small square 1710 is placed around landmark L 1702 in which landmark L 1702 is located in the center. Coordinates are determined for each device that has generated content near landmark L 1702 and designated A 1704, B 1706 and C 1708. Next, orientation of the device when the content was generated by each device is determined and an arrow is drawn from each coordinate to demonstrate the general location of the recorded content. Therefore, the arrow 1712 extends from location A 1704, arrow 1714 extends from location B 1706 and arrow 1716 extends from location C 1708.

Next, it is determined if any of the arrows 1712, 1714, and 1716 intersect square 1710. Arrows which intersect the square 1710 are presumed to include landmark L 1702 in their recorded content. In the present example, only arrow 1712 associated with location A 1704 intersects 1710. As such only content associated with location A 1704 is retrieved by the CIP and presented to the user. As indicated above, the user can always refine the search if many records are retrieved by the CIP.

Figure 18:
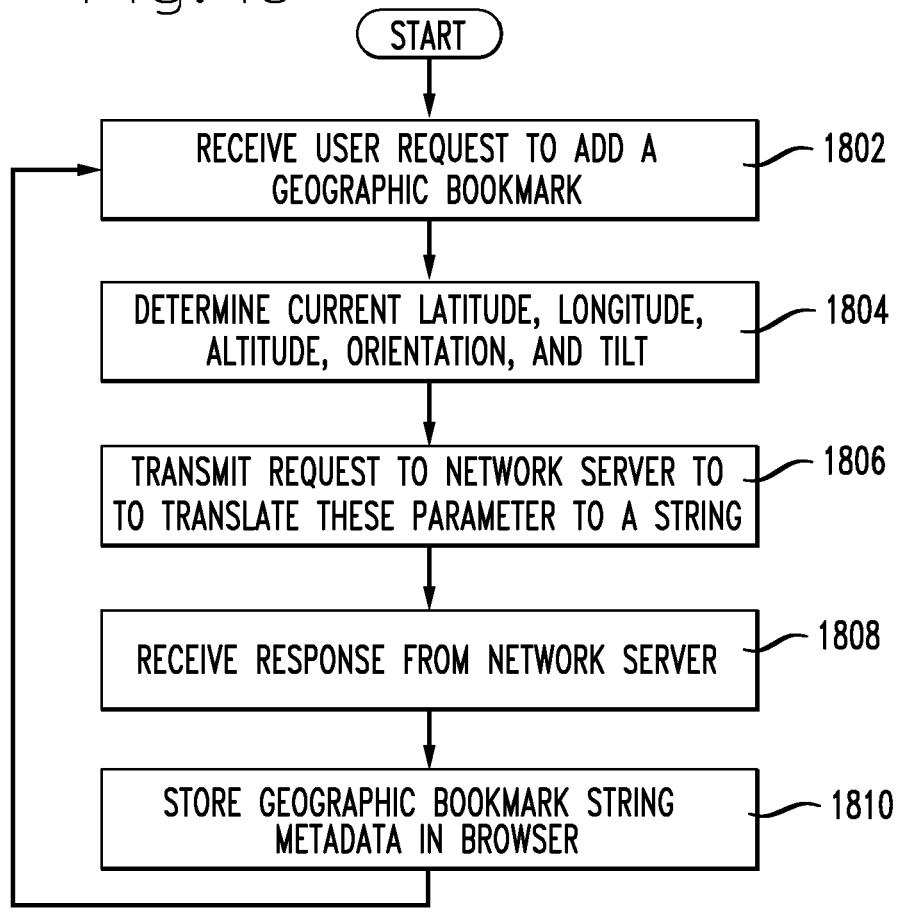
FIG. 18 illustrates a flow chart that depicts the steps for creating a geographic bookmark at the CIP in accordance with the present invention.

Referring to FIG. 18, there is shown a flow chart that depicts the steps necessary for creating a geographic bookmark at the CIP. The bookmark can be created based on content being generated by a device used by the user or based on content being viewed by a user on a web site. The CIP receives a request from a user to add a geographic bookmark (step 1802). Next, the latitude, longitude, orientation and tilt for the origins of the content are determined (step 1804). In the situation where the user's device is generating the content, as discussed above, the device would provide the requested coordinates. In the situation where the content is posted on a web site, the requested coordinates are extracted from the data record associated with the particular content.

A request is made to the CIP to translate the coordinate parameters into a data record. In the case of the user-generated content, the data record is created based on the coordinates and other data which may be available. In the case of content displayed on a web site, the data record for the content is merely duplicated. In both cases a bookmark is created which associates the user and the specified content and stored in a file in the CIP that is associated with the user. An identifier for the bookmark can be automatically generated by the CIP or created by the user. Once the bookmark has been created, a response is received from the CIP by the user (step 1808). The bookmark is then stored in the user's browser for future use (step 1810).

While the present invention has been described in connection with the illustrated embodiments, it will be appreciated and understood that modifications may be made without departing from the true spirit and scope of the invention. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

We claim:

1. A method comprising:
   receiving a request for media content associated with an identified location, the media content comprising at least an image, to yield requested media content;
   in response to the request, accessing a database of stored media content, wherein the database of stored media content stores an orientation direction for a first device that generated a respective record in the database of stored media content when the first device was at a device location at which the first device could take an image of the identified location and when the first device generated the respective record of the identified location;
   returning a selected record of the database of stored media content based on a vector associated with the orientation direction of the first device at the device location when the first device generated the selected record at the identified location; and providing the selected record to a second device associated with a user who initiated the request.

2. The method of claim 1, wherein the database of stored media content is further organized to comprise global location coordinates of the first device when the first device generated the respective record in the database of stored media content.

3. The method of claim 2, wherein the global location coordinates of the first device are within a first boundary around the identified location and wherein a two dimensional shape around the identified location defines a second boundary.

4. The method of claim 1, further comprising presenting a pictorial representation of identification data for the selected record, wherein the pictorial representation of identification data comprises a link to network-based multimedia content associated with the requested media content.

5. The method of claim 4, wherein the identification data further comprises one of a longitude coordinate, a latitude coordinate, a date, a time, and the orientation direction being within an orientation threshold.

6. The method of claim 5, further comprising:
extracting, from the identification data, one of a time of day and a date; and
using the one of the time of day and the date to identify the selected record.

7. The method of claim 2, further comprising:
using the global location coordinates of the first device to associate a respective record of the database of stored media content with a particular geographic region.

8. The method of claim 1, wherein the vector comprises the orientation direction of the first device when the first device recorded media associated with the identified location.

9. A system comprising:
a processor; and
a non-transitory computer-readable storage medium having instructions stored which, when executed on the processor, cause the processor to perform operations comprising:
receiving a request for media content associated with an identified location, the media content comprising at least an image, to yield requested media content;
in response to the request, accessing a database of stored media content, wherein the database of stored media content stores an orientation direction for a first device that generated a respective record in the database of stored media content when the first device was at a device location at which the first device could take an image of the identified location and when the first device generated the respective record at the identified location;
returning a selected record of the database of stored media content based on a vector associated with the orientation direction of the first device at the device location when the first device generated the selected record of the identified location; and
providing the selected record to a second device associated with a user who initiated the request.

10. The system of claim 9, wherein the database of stored media content is further organized to comprise global location coordinates of the first device when the first device generated the respective record in the database of stored media content.

11. The system of claim 10, wherein the global location coordinates of the first device are within a first boundary around the identified location and wherein a two dimensional shape around the identified location defines a second boundary.

12. The system of claim 9, further comprising presenting a pictorial representation of identification data for the selected record, wherein the pictorial representation of identification data comprises a link to network-based multimedia content associated with the requested media content.

13. The system of claim 12, wherein the identification data further comprises one of a longitude coordinate, a latitude coordinate, a date, a time, and the orientation direction being within an orientation threshold.

14. The system of claim 13, wherein the non-transitory computer-readable storage medium stores further instructions which, when executed on the processor, cause the processor to perform operations further comprising:
extracting, from the identification data, one of a time of day and a date; and
using the one of the time of day and the date to identify the selected record.

15. The system of claim 10, wherein the non-transitory computer-readable storage medium stores further instructions which, when executed on the processor, cause the processor to perform operations further comprising:
using the global location coordinates of the first device to associate a respective record of the database of stored media content with a particular geographic region.

16. The system of claim 9, wherein the vector comprises the orientation direction of the first device when the first device recorded media associated with the identified location.

17. A non-transitory computer-readable storage device having instructions stored which, when executed on a computing device, cause the computing device to perform operations comprising:
receiving a request for media content associated with an identified location the media content comprising at least an image, to yield requested media content;
in response to the request, accessing a database of stored media content, wherein the database of stored media content stores an orientation direction for a first device that generated a respective record in the database of stored media content when the first device was at a device location at which the first device could take an image of the identified location and when the first device generated the respective record at the identified location;
returning a selected record of the database of stored media content based on a vector associated with the orientation direction of the first device at the device location when the first device generated the selected record of the identified location; and
providing the selected record to a second device associated with a user who initiated the request.

18. The non-transitory computer-readable storage device of claim 17, wherein the database of stored media content is further organized to comprise global location coordinates of the first device when the first device generated the respective record in the database of stored media content.

19. The non-transitory computer-readable storage device of claim 18, wherein the global location coordinates of the first device are within a first boundary around the identified location and wherein a two dimensional shape around the identified location defines a second boundary.

20. The non-transitory computer-readable storage device of claim 17, further comprising presenting a pictorial representation of identification data for the selected record, wherein the pictorial representation of identification data comprises a link to network-based multimedia content associated with the requested media content.

* * * * *